(12) United States Patent
Harwath

(10) Patent No.: US 9,798,100 B2
(45) Date of Patent: Oct. 24, 2017

(54) ENVIRONMENTAL SEALING ARRANGEMENT FOR FURCATED OPTICAL FIBERS

(71) Applicant: CommScope Technologies LLC, Hickory, NC (US)

(72) Inventor: Frank A. Harwath, Naperville, IL (US)

(73) Assignee: CommScope Technologies LLC, Hickory, NC (US)

(*) Notice: Subject to any disclaimer, the term of this patent is extended or adjusted under 35 U.S.C. 154(b) by 0 days.

(21) Appl. No.: 15/364,804

(22) Filed: Nov. 30, 2016

(65) Prior Publication Data

US 2017/0082818 A1    Mar. 23, 2017

Related U.S. Application Data

(62) Division of application No. 14/633,827, filed on Feb. 27, 2015, now abandoned.

(60) Provisional application No. 62/011,177, filed on Jun. 12, 2014.

(51) Int. Cl.
| | |
|---|---|
| *G02B 6/44* | (2006.01) |
| *B29D 11/00* | (2006.01) |
| *B29K 23/00* | (2006.01) |
| *B29K 77/00* | (2006.01) |

(52) U.S. Cl.
CPC ...... *G02B 6/4473* (2013.01); *B29D 11/00711* (2013.01); *B29D 11/00721* (2013.01); *G02B 6/443* (2013.01); *G02B 6/4432* (2013.01); *G02B 6/4476* (2013.01); *G02B 6/4479* (2013.01); *G02B 6/4486* (2013.01); *G02B 6/4495* (2013.01); *B29D 11/0075* (2013.01); *B29K 2023/00* (2013.01); *B29K 2077/00* (2013.01); *B29K 2995/0018* (2013.01)

(58) Field of Classification Search
CPC .... G02B 6/4473; G02B 6/443; G02B 6/4476; G02B 6/4486; G02B 6/4432; G02B 6/4479; G02B 6/4495; B29D 11/0071; B29D 11/00721; B29K 2023/00; B29K 2077/00; B29K 2995/0018
USPC ........................................................ 385/102
See application file for complete search history.

(56) References Cited

U.S. PATENT DOCUMENTS

| | | | | |
|---|---|---|---|---|
| 4,884,862 A | * | 12/1989 | Kofod ................. | G02B 6/3878 174/76 |
| 5,853,626 A | * | 12/1998 | Kato ................... | G02B 6/4214 216/24 |
| 5,903,693 A | * | 5/1999 | Brown ................. | G02B 6/4471 385/100 |
| 6,167,179 A | * | 12/2000 | Weiss .................. | G02B 6/4494 385/100 |

(Continued)

OTHER PUBLICATIONS

Product data sheet for Henkel macromelt.*

*Primary Examiner* — Thomas A Hollweg
*Assistant Examiner* — Guy Anderson
(74) *Attorney, Agent, or Firm* — Myers Bigel, P.A.

(57) ABSTRACT

An assembly for protecting spliced optical fibers includes: a fiber optic cable comprising at least one optical fiber and a surrounding jacket; at least one elongate tubular member housing the optical fiber, wherein a gap exists between the elongate tubular member and the jacket such that the optical fiber has an exposed region; and a premold block formed of an ultra-low pressure material, the premold block encasing the exposed region of the optical fiber.

10 Claims, 2 Drawing Sheets

(56) References Cited

U.S. PATENT DOCUMENTS

| | | | | |
|---|---|---|---|---|
| 6,771,861 B2* | 8/2004 | Wagner | ........... | G02B 6/4472 385/100 |
| 7,147,384 B2* | 12/2006 | Hardcastle | ........... | G02B 6/3861 385/53 |
| 7,270,485 B1* | 9/2007 | Robinson | ........... | G02B 6/4477 385/136 |
| 8,571,367 B2* | 10/2013 | Van Der Meulen | . | G02B 6/4472 385/100 |
| 8,731,364 B2* | 5/2014 | Murano | ........... | G02B 6/4471 385/134 |
| 8,737,786 B1* | 5/2014 | Compton | ........... | G02B 6/4472 385/100 |
| 8,842,954 B2* | 9/2014 | Burris | ........... | G02B 6/4415 385/101 |
| 8,948,557 B2* | 2/2015 | Islam | ........... | G02B 6/4471 385/107 |
| 2002/0154869 A1* | 10/2002 | Chan | ........... | G02B 6/4292 385/88 |
| 2003/0210875 A1* | 11/2003 | Wagner | ........... | G02B 6/4472 385/100 |
| 2005/0213891 A1* | 9/2005 | Hardcastle | ........... | G02B 6/3861 385/60 |
| 2009/0152746 A1* | 6/2009 | Wells | ........... | B29C 45/14549 264/1.28 |
| 2009/0190889 A1* | 7/2009 | Robinson | ........... | G02B 6/4471 385/110 |
| 2013/0004122 A1* | 1/2013 | Kingsbury | ........... | G02B 6/4471 385/31 |
| 2013/0294735 A1* | 11/2013 | Burris | ........... | G02B 6/4415 385/101 |
| 2013/0336622 A1* | 12/2013 | Islam | ........... | G02B 6/4471 385/100 |

* cited by examiner

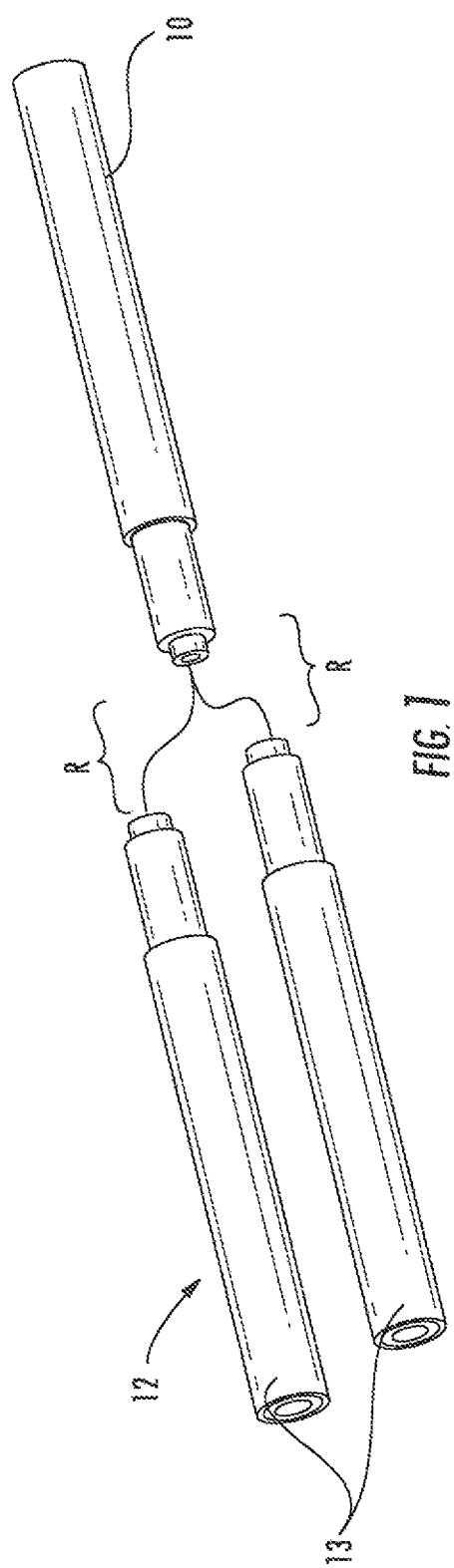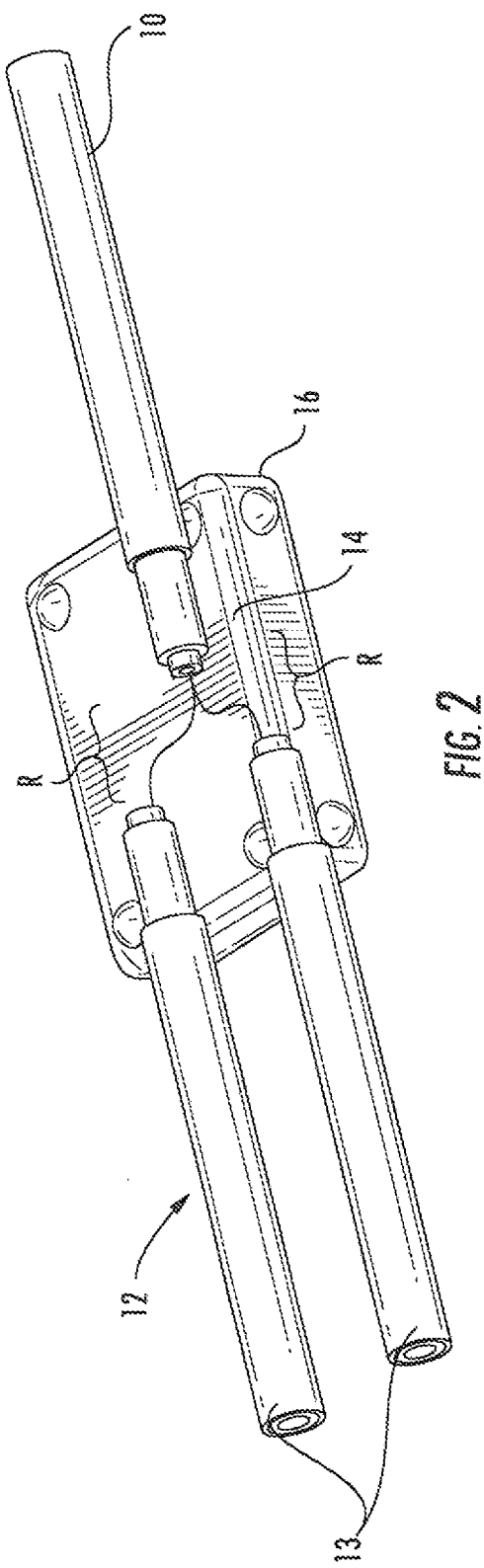

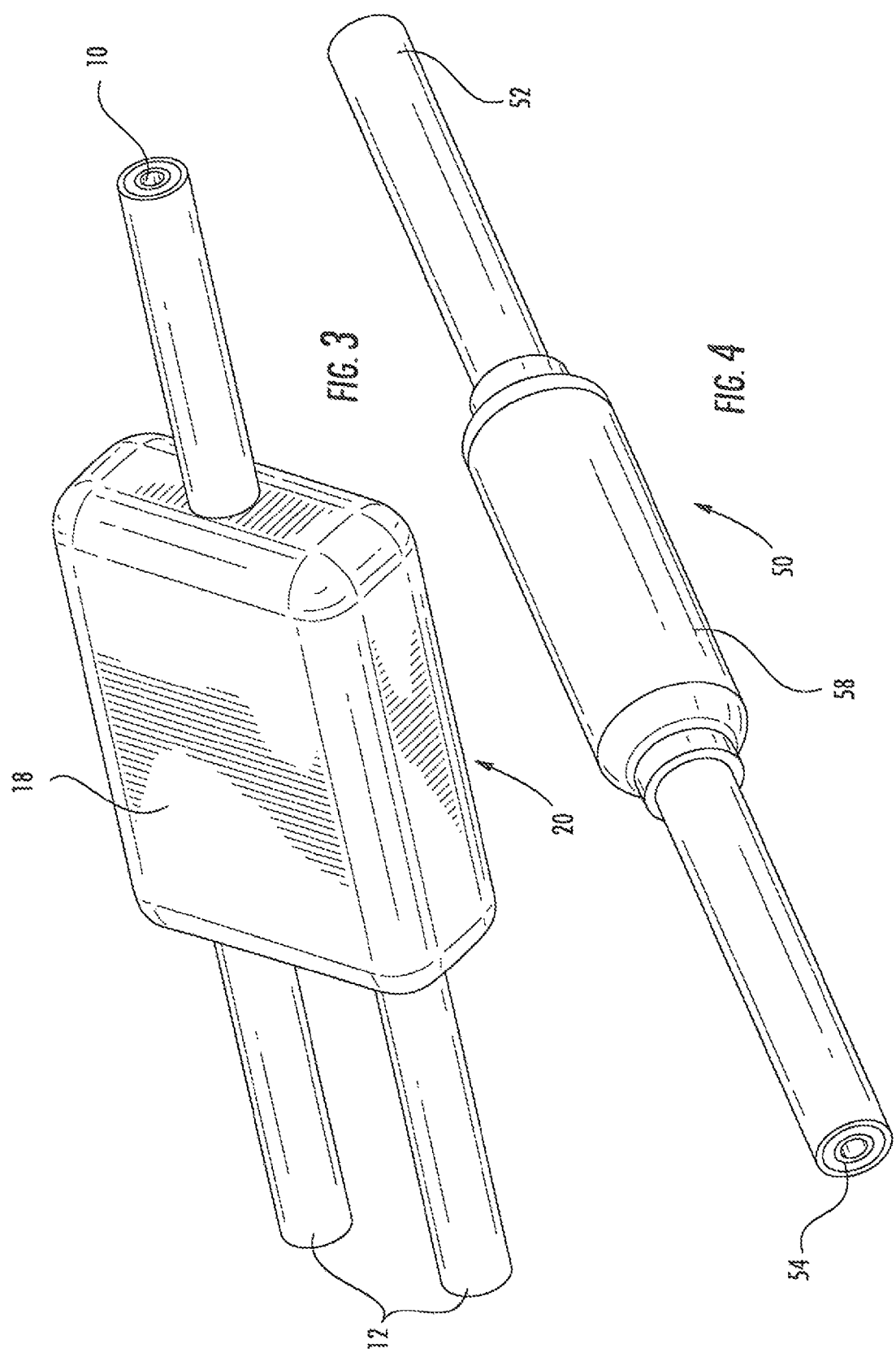

ENVIRONMENTAL SEALING ARRANGEMENT FOR FURCATED OPTICAL FIBERS

RELATED APPLICATION

This application claims the benefit of and priority from U.S. Provisional Patent Application No. 62/011,177, filed Jun. 12, 2014 and is a divisional from U.S. patent application Ser. No. 14/633,827 filed Feb. 27, 2015, the disclosures of which are hereby incorporated herein by reference in their entirety.

FIELD OF THE INVENTION

The present invention relates generally to optical fibers, and more specifically to the protection of optical fibers from environmental conditions.

BACKGROUND

In many fiber optic cable assemblies, it may be necessary to remove the outer jacket layers of the cable and expose a length of fiber that is then inserted into a smaller diameter furcation tube. This may be done because a robust fiber optic cable normally has a jacket diameter that is too large to fit into standard fiber optic connectors, whereas a smaller diameter furcation tube can fit into such connectors. Unfortunately, this transition technique leaves a gap between the furcation tube and the cable jacket, which exposes a section of the fiber to the environment. It also breaks the continuity of strength members in the cable that are designed to absorb the tensile load of the assembly rather than subjecting the fiber to the load. Similar exposure of fibers may occur when a fiber optic cable is broken out (i.e., "furcated") into multiple branches of fibers or subgroups of fibers, each with its own furcation tube.

One solution for covering the gap between the jacket and the single furcation tube utilizes a close fitting plastic tube (transition tube) that fits over the gap. Once it is in place, the transition tube is filled with epoxy. The epoxy mechanically binds the strength members from the furcation tube and the cable together to avoid having the fiber carry any tensile load. In addition, the epoxy fills the gap, thereby preventing contamination or environmental attack of the fiber. The transition tube and the sections of the furcation tube and cable immediately adjacent the furcation tube are covered with a piece of adhesive lined heat shrink tubing. During a heating process to shrink the heat-shrink tubing, the adhesive lining the tubing melts and forms a bond between the transition tube and the inner surface of the heat-shrink tubing. The heat shrink tubing adds UV and abrasion resistance to the assembly.

Although this technique is commonly employed, it has some disadvantages. The epoxy is expensive due to its initial cost, pot life, unrecoverable waste, and the slow rate of cure. Also, it involves a number of different components and a good deal of labor to complete. Thus, a technique that reduces or eliminates these shortcomings may be desirable.

SUMMARY

As a first aspect, embodiments of the invention are directed to an assembly for protecting optical fibers. The assembly comprises: a fiber optic cable comprising at least one optical fiber and a surrounding jacket; at least one elongate tubular member housing the optical fiber, wherein a gap exists between the elongate tubular member and the jacket such that the optical fiber has an exposed region; and a premold block formed of an ultra-low pressure material, the premold block encasing the exposed region of the optical fiber.

As a second aspect, embodiments of the invention are directed to an assembly, comprising: a fiber optic cable comprising at least one optical fiber and a surrounding jacket; an elongate tubular member housing the optical fiber, wherein a gap exists between the elongate tubular member and the jacket such that the optical fiber has an exposed region; and an overmold formed of a low pressure material, the overmold encasing the exposed region of the optical fiber.

As a third aspect, embodiments of the invention are directed to a method for breaking out optical fibers from a fiber optic cable. The method comprises the steps of:

(a) stripping a portion of a surrounding jacket from a fiber optic cable comprising at least one optical fiber residing within the jacket;

(b) inserting the optical fiber into an elongate tubular member, wherein a gap exists between the elongate tubular member and the jacket such that the optical fiber has an exposed region; and (c) molding a premold block over the exposed region of the optical fiber at a molding pressure of between about 0 and 50 psi.

As a fourth aspect, embodiments of the invention are directed to a method for transitioning optical fibers from a fiber optic cable into an elongate tubular member, comprising the steps of:

(a) stripping a portion of a surrounding jacket from a fiber optic cable comprising at least one optical fiber residing within the jacket;

(b) inserting the optical fiber into an elongate tubular member, wherein a gap exists between the elongate tubular member and the jacket such that the optical fiber has an exposed region; and (c) molding an overmold over the exposed region of the optical fibers at a molding pressure of between about 50 and 800 psi.

BRIEF DESCRIPTION OF THE FIGURES

FIG. 1 is a perspective view of a fiber optic cable being broken out into two separate subgroups of optical fibers, wherein the subgroups of fibers are housed in furcation tubes.

FIG. 2 is a perspective view of the fiber optic cable and optical fibers within furcation tubes of FIG. 1 covered with a protective premold block according to embodiments of the invention, wherein the premold block is shown as transparent for clarity.

FIG. 3 is a perspective view of an ovemolded cover that surrounds the premold block of FIG. 2.

FIG. 4 is a perspective view of a transition between a fiber optic cable and optical fibers within a furcation tube protected by an overmolded cover according to embodiments of the invention.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Referring now to the figures, an exemplary transition arrangement between a fiber optic cable 10 and two optical fiber subgroups 12 housed within furcation tubes 13 is illustrated in FIG. 1. As can be seen therein, optical fibers from the fiber optic cable 10 diverge into the subgroups 12, thereby leaving a region R of optical fibers unprotected by a jacket or a strength member. Each of the optical fiber subgroups 12 typically includes multiple fibers, but in some instances may include only a single optical fiber.

Referring now to FIG. 2, the region R and the ends of the fiber optic cable 10 and optical fiber subgroups 12 are shown encased within a ultra-low pressure premold block 14 that is molded thereon. The premold block 14 is applied over the exposed fiber region R and the ends of the fiber optic cable 10 and the optical fiber subgroups 12 with extremely low pressure (e.g., 1-50 psi), which is sufficiently low that it does not damage the exposed optical fibers. (Compare, for example, the typical molding pressure from a conventional injection molding machine, which may be on the order of 1,000 to 20,000 psi). As used herein, the term "ultra-low pressure" refers to a molding pressure of between 0 and 50 psi. Once the material of the premold block 14 is cured (typically in 10 seconds or so) and removed from the mold, the exposed optical fibers in the region R are protected from the environment.

The premold block 14 may be formed of any material that may be suitable for ultra-low pressure molding. Exemplary materials include polyamides and polyolefins; specific exemplary materials include MACROMELT OM 648 polyamide hot melt adhesive, available from Henkel AG and Co., Dusseldorf, Germany.

The premold block 14 illustrated herein is generally a rectangular solid and includes a plurality of bumps 16 on various surfaces thereof. The bumps 16 may be included to provide locating features for an overlying overmold layer 18, discussed below. Although shown as generally rectangular, the premold block 14 may be of any shape suitable for encasing and protecting the exposed optical fibers, including cubic, ovoid, cylindrical and the like.

Referring now to FIG. 3, an assembly 20 that includes the fiber optic cable 10, the optical fiber subgroups 12, the premold block 14 (not shown in FIG. 3), and the aforementioned overmold layer 18 is illustrated therein. The overmold layer 18 is applied (i.e., molded in a mold) over the premold block 14. The overmold layer 18 is typically applied via low pressure (i.e., 50 to 800 psi) molding. The overmold layer 18 can provide an additional mechanical layer that reinforces the assembly 20, and may also provide a better aesthetic surface for the assembly 20.

The overmold layer 18 may be formed of any material that is compatible with the material of the premold block 14 and that is suitable for low pressure molding. Exemplary materials include polyamides and polyolefins. Exemplary low pressure molding materials include the aforementioned MACROMELT OM 648 polyamide.

The bumps 16 or locating features can ensure that the overmold layer 18 is substantially uniform in thickness. Without the locating features, there is a tendency for the premold block 14 to be pushed to the surface by the molten plastic during injection. This can produce very poor surface finish, and the possibility of fluid migration into resultant crevasses.

The assembly 20 enjoys multiple advantages over the prior transition technique discussed above. The elimination of epoxy can reduce cost, waste, and cycle times. The absence of the termination tube can also reduce cost and labor.

Referring now to FIG. 4, another assembly, designated broadly at 50, is shown therein. The assembly includes a first segment of a fiber optic cable 52 and a second segment of a fiber optic cable 54, wherein the fibers in the second segment 54 are housed within a furcation tube. In some embodiments, the first segment 52 has a diameter that is slightly higher than the second segment 54. In this embodiment, exposed optical fibers are protected by a low-pressure overmold of the type described above (not visible in FIG. 4). The overmold is then covered with an adhesive-lined heat shrink tube 58 for added abrasion- and UV-resistance.

Compared to the prior technique of reducing the diameter of a fiber optic cable, the assembly 50 offers at least two advantages. Replacement of epoxy can reduce cost, waste, and cycle times. In addition, there is no need for a separate termination tube in addition to the furcation tube and the epoxy, which eliminates the cost of the tube itself and the labor to install the tube.

It should also be understood that the furcation tubes 13 discussed above may be replaced with a cable jacket or other elongate tubular member, which may also serve the purpose of protection the fiber(s) contained therein.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A method for breaking out optical fibers from a fiber optic cable, comprising the steps of:
   (a) stripping a portion of a surrounding jacket from a fiber optic cable comprising at least one optical fiber residing within the jacket;
   (b) inserting the optical fiber into an elongate tubular member, wherein a gap exists between the elongate tubular member and the jacket such that the optical fiber has an exposed region; and
   (c) molding a premold block over the exposed region of the optical fiber at a molding pressure of between about 0 and 50 psi, the premold block being in direct contact with and encasing the exposed region of the optical fiber.

2. The method defined in Claim 1, wherein step (c) comprises molding the premold block from an ultra-low pressure material.

3. The method defined in claim 2, wherein the premold material is a polymeric material selected from the group consisting of polyamide and polyolefin.

4. The method, defined in claim 1, further comprising the step of molding an overmold layer over the premold block.

5. The method defined in claim 4, wherein the premold block includes locating features that assist with locating the premold block within a mold used to mold the overmold layer.

6. The method defined in claim 1, wherein the at least one optical fibers is a plurality of optical fibers, and wherein the elongate tubular member is a plurality of furcation tubes.

7. A method for transitioning optical fibers from a fiber optic cable into an elongate tubular member, comprising the steps of:

(a) stripping a portion of a surrounding jacket from a fiber optic cable comprising at least one optical fiber residing within the jacket;

(b) inserting the optical fiber into an elongate tubular member, wherein a gap exists between the elongate tubular member and the jacket such that the optical fiber has an exposed region; and (c) molding an overmold over the exposed region of the optical fibers at a molding pressure of between about 50 and 800 psi, the overmold being in direct contact with and encasing the exposed region of the optical fiber.

8. The method defined in claim 7, further comprising the step of applying a heat-shrink tube that overlies the overmold.

9. The method defined in claim 7, wherein the low pressure material is a polymeric material selected from the group consisting of polyamide and polyolefin.

10. The method defined in claim 7, wherein the at least one optical fiber is a plurality of optical fibers, and wherein the elongate tubular member is a furcation tube.

* * * * *